United States Patent [19]
Lane et al.

[11] 3,735,343
[45] May 22, 1973

[54] BRAKE LINING WEAR WARNING SYSTEM

[75] Inventors: Buddy F. Lane; Donald E. Church, both of Richmond, Ind.

[73] Assignee: Avco Corporation, Richmond, Ind.

[22] Filed: Aug. 12, 1971

[21] Appl. No.: 171,071

[52] U.S. Cl. .............................. 340/52 A, 200/61.4
[51] Int. Cl. .............................................. B60t 17/22
[58] Field of Search .................. 340/52 R, 52 A, 52 B; 200/61.4, 61.44

[56] References Cited

UNITED STATES PATENTS

| | | | |
|---|---|---|---|
| 3,440,604 | 4/1969 | Phillips | 340/52 A |
| 3,456,236 | 7/1969 | Labartino et al. | 340/52 A |

*Primary Examiner*—Alvin H. Waring
*Attorney*—Charles M. Hogan and Eugene C. Goodale

[57] ABSTRACT

A brake lining wear warning system for indicating when brake linings are dangerously worn and require replacement and provides a warning signal to a vehicle operator when the brake lining has worn a predetermined amount. Engagement of a detector with the brake drum initiates an operator warning signal.

8 Claims, 9 Drawing Figures

PATENTED MAY 22 1973 3,735,343

INVENTORS
BUDDY F. LANE
DONALD E. CHURCH
BY Charles M. Hogan
Eugene C. Goodale
ATTORNEYS PATENTED MAY 22 1973 3,735,343
SHEET 2 OF 2
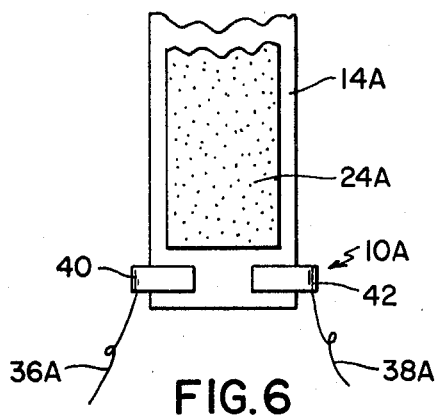
FIG. 6
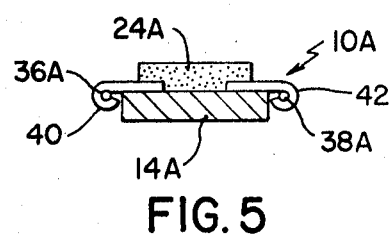
FIG. 5
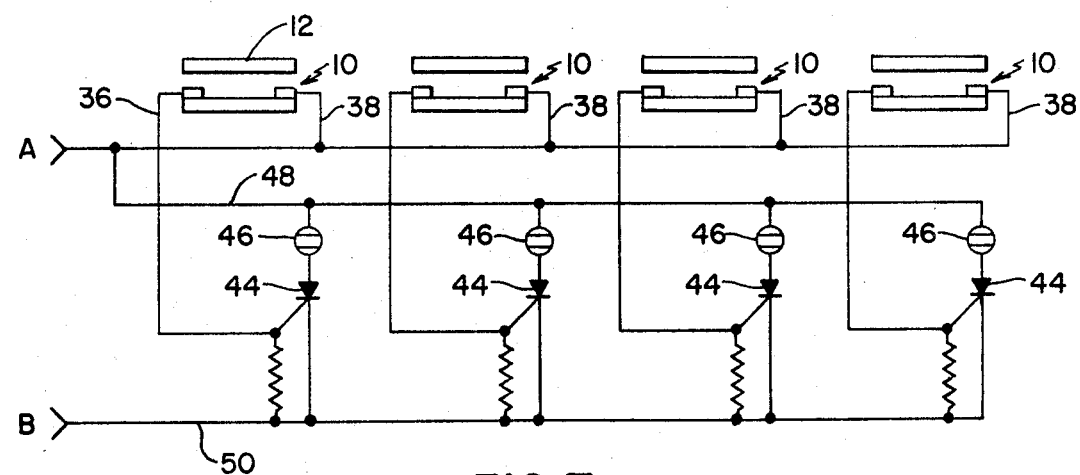
FIG. 7
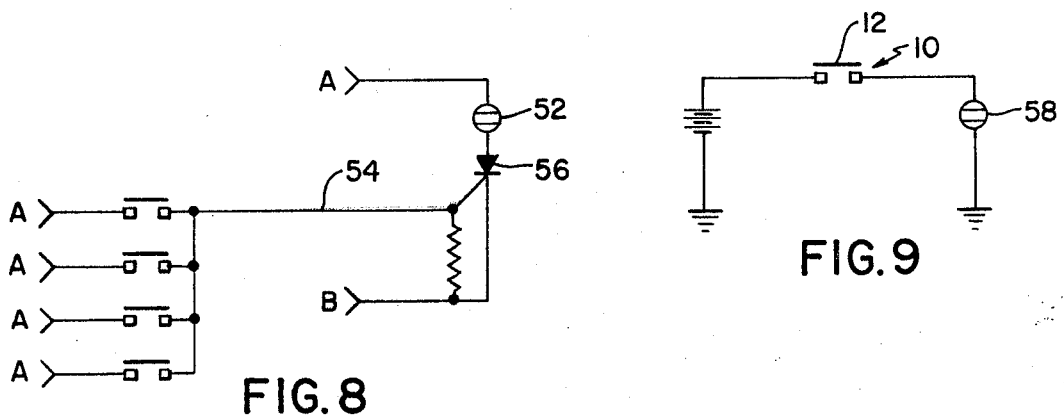
FIG. 8
FIG. 9
INVENTORS
BUDDY F. LANE
DONALD E. CHURCH
BY *Charles M. Hogan*
*Eugene C. Goodale*
ATTORNEYS

BRAKE LINING WEAR WARNING SYSTEM

BACKGROUND OF THE INVENTION

This invention pertains to wear warning systems and more particularly to a brake lining wear warning system for providing the vehicle operator with a warning that the brake linings have reached a point where continued use might be dangerous.

Vehicle brakes are not easily inspected to determine the amount of wear of the brake linings. Accordingly, it is not uncommon for vehicle operators to continue driving a vehicle after the brake linings are worn to a dangerous condition. Continued use of such worn brake linings may result in scored brake drums which increases the danger of accidents, and also greatly increases the cost of repairs.

Many devices have been developed in the past to provide a signal to a vehicle operator to inform him that brake lining wear has progressed a predetermined amount. However, these devices have generally been sophisticated, bulky and very expensive to manufacture and install in vehicles. The operational reliability of these devices has been entirely unsatisfactory and their anticipated widespread use has never materialized. Many of the prior devices have utilized probes and the like which protrude laterally through the brake linings. A problem with this type probe is that it was often difficult to secure the probe within the brake lining material and, in addition, a portion of the brake lining is removed for the probe which decreases the amount of brake lining available for engagement with the brake drum.

Accordingly, it is an object of this invention to provide a brake lining wear warning system which is installed without decreasing the area of the brake lining engaging surface.

Another object of this invention is to provide a brake lining wear warning system which is compact, easy to manufacture and install, and reasonably priced.

A still further object of this invention is to provide a brake lining wear warning system which does not require the brake structure to be disassembled to determine if the linings are worn to the point that they need replacing.

Yet another object of this invention is to provide a brake lining wear warning system that does not interfere with normal operation of the brake.

SUMMARY OF THE INVENTION

This invention provides an improved brake lining wear warning system for indicating when brake linings have worn a predetermined amount and are in need of replacement. The warning system includes a wear detector which is attached to the brake shoe adjacent the brake lining. The detector does not interfere with the brake lining-brake drum area of contact. The warning system will provide a continuous danger signal even after the brakes have been disengaged or may be so arranged as to provide a signal only when the brakes are applied. The wear detector and warning system are of simple and economical construction, are efficient in operation and do not interfere with the normal braking action of the brake structure.

Other objects, details, uses and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which:

FIG. 5 is a sectional view, similar to FIG. 3, illustrating another exemplary embodiment of the wear detector of this invention;

FIG. 6 is a view, similar to FIG. 4, illustrating the wear detector of FIG. 5;

FIG. 7 is a schematic presentation of one form of the invention;

FIG. 8 is a schematic presentation of another form of the invention; and

FIG. 9 is a schematic presentation illustrating a third circuit embodying this invention.

DESCRIPTION OF THE ILLUSTRATED EMBODIMENTS

Figure 1:
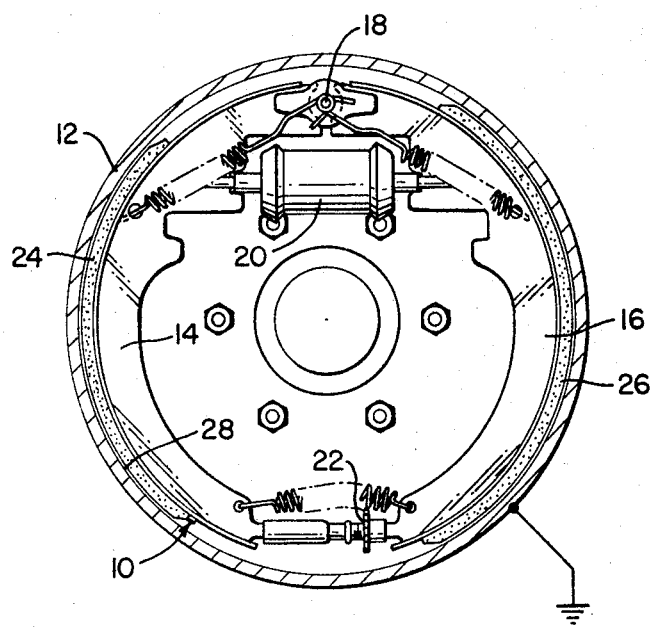
FIG. 1 is an elevation view, partially in section, showing the general location of the brake lining wear detector of this invention.
Figure 2:
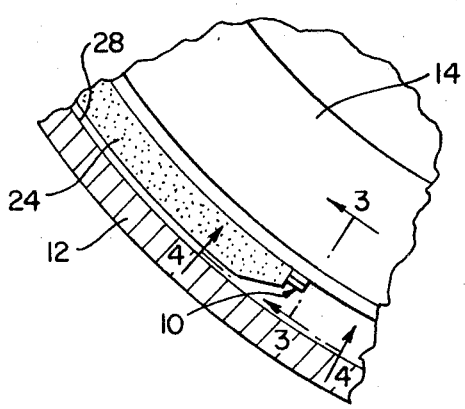
FIG. 2 is an enlarged elevational view of the wear detector illustrated in FIG. 1.

Reference is now made to FIGS. 1 and 2 of the drawings, which illustrate one exemplary embodiment of the improved wear detector for use in a brake lining wear warning system, which is designated generally by the reference numeral 10. The detector 10 is mounted in a conventional brake structure. The brake structure comprises a brake drum 12 having conventional brake shoes 14 and 16 pivotally mounted therein. The brake shoes 14 and 16 are pivotally mounted on pin 18 and actuated by an hydraulic cylinder 20. An automatic adjuster 22 positions the shoes to assure engagement of linings 24 and 26 with the interior surface 28 of the brake drum 12.

Figure 4:
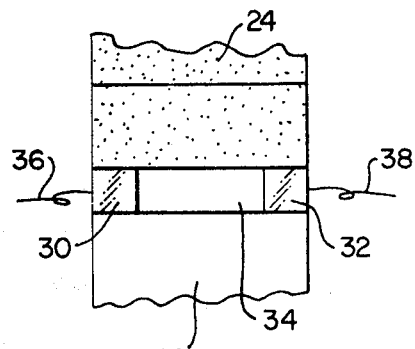
FIG. 4 is a view taken along line 4—4 of FIG. 2.
Figure 3:
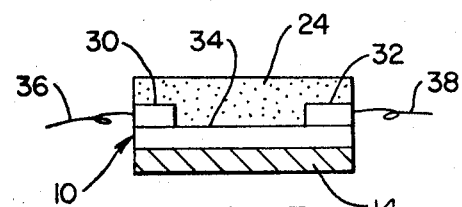
FIG. 3 is a sectional view taken along line 3—3 of FIG. 2.

As shown in FIGS. 3 and 4, the wear detector 10 consists of two soft metallic conductive sheets or elements 30 and 32, such as copper, which are bonded to a non-conductive sheet 34. The conductive elements 30 and 32 are connected to the electrical motoring system, shown in FIG. 7, by means of the lead wires 36 and 38. The wear detector 10 is bonded to the brake shoe 14 (FIGS. 1 and 2) by any suitable means. With prolonged use, the brake linings 24 and 26 will wear to a depth which is predetermined and controlled by the thickness of the combined conductive elements 30 and 32 and the non-conductive sheet 34. When the brake linings have worn to this predetermined thickness, the application of the brakes will cause the brake drum 12 to complete the electrical circuit between the conductive elements 30 and 32. The completion of this circuit enables a suitable warning signal such as a lamp, indicating that brake lining replacement is necessary.

Another exemplary embodiment of the wear detector of this invention is illustrated in FIGS. 5 and 6 of the drawings. The wear detector thus illustrated is very similar to the wear detector 10; therefore, such wear detector will be designated generally by the reference numeral 10A. The main difference between wear detector 10A and the wear detector 10 is in the construction of the electrical contacts. Two soft metallic strips 40 and 42 are formed or crimped around the ends of lead wires 36A and 38A. The metallic strips 40 and 42 may be made of anodized aluminum and bonded to the brake shoe 14A by any conventional means. The anodized aluminum will provide a protective surface against various types of unfavorable environments, as well as providing an insulator between the lead wires 36A and 38A and the brake shoe. When the brake lining 24A has worn a sufficient amount, the brake drum will make contact between the strips 40 and 42. When the brake drum wears through the anodized surface, the electrical circuit between the two strips 40 and 42 will be completed so as to enable a suitable warning signal.

Referring now to FIG. 7, there is shown a schematic presentation of one exemplary embodiment of a suitable circuit which may be used with the brake lining wear warning system of this invention. It is seen that the system includes a plurality of wear detectors 10, one for each wheel. Each wear detector 10 is connected with a reference point A by lead 38. Lead 36 is connected with an appropriate silicon controlled rectifier 44. A suitable signal, such as a plurality of lamps 46, one indicating each wheel, is connected to point A by leads 48 and to reference point B through SCR 44 and common lead 50. When the brake lining has worn a sufficient amount, the application of the vehicle brakes causes one of the four brake drums 12 to contact the conducting elements of the wear detector 10. This action effectively shorts out the two exposed conductors on the brake shoe, thereby effecting a switch closure. The closure of any one of the four wear detectors 10 applies battery power to the gate of the appropriate SCR 44. The application of power to the SCR will cause the SCR to go to the "on" state and enable the appropriate lamp 46. The utilization of this circuit provides that the lamp 46 will remain enabled even after the vehicle brakes have been disengaged so that the brake drum 12 no longer contacts the wear detector 10. It should be noted that reference points A and B may be connected for either positive ground or negative ground. In the positive ground condition, point A is considered as ground and point B is at a negative potential. In the negative ground condition, point A is at a positive potential and point B is at ground.

In FIG. 8, it is seen that the plurality of signal lamps have been replaced by a single indicating lamp 52. The wear detectors 10 from each wheel are connected by a common lead 54 to an SCR 56. In this embodiment, the lamp 52 will be enabled by the shorting out of any of the wear detectors 10. The potential of points A and B may likewise be connected as hereinabove described.

FIG. 9 illustrates another embodiment of the warning system of this invention in which the signal lamp is only enabled when the brakes are applied. In this embodiment, one side of the wear detectors 10 is connected directly to a power source and the other side of the detector 10 is connected directly with the signal lamp 58. Thus, the circuit to enable lamp 58 is only complete when the brake drum 12 is contacting the wear detector 10. Thus, the lamp 58 is only enabled at such times as when the brakes are applied.

It can be seen that the brake lining wear warning system of this invention provides a means to visually indicate to an operator when the brake linings need replacement. The wear detector does not interfere with nor decrease the contact surface between the brake lining and brake drum. Accordingly, the objectives hereinbefore set forth have been accomplished.

While present exemplary embodiments of this invention have been illustrated and described, it will be recognized that this invention may be otherwise variously embodied and practiced by those skilled in the art.

What is claimed is:

1. A brake lining wear warning system comprising in combination:
   a brake drum;
   a brake shoe selectively actuated to a brake applying position;
   a brake lining mounted on a portion of the surface of said brake shoe and arranged to engage said brake drum in the brake applying position;
   a lining wear detector mounted adjacent said lining on the portion of said brake shoe surface not covered by said brake lining, said detector having a predetermined thickness wherein said detector will engage said brake drum in the brake applying position after a predetermined amount of lining wear;
   an electrical power source;
   signal means electrically connected with said power source and said wear detector wherein contact of said wear detector with said brake drum enables said signal means to indicate that said lining has worn a predetermined amount.

2. The combination as set forth in claim 1 in which said wear detector comprises a first contact and a second contact, said contacts being electrically separated, said first contact being connected with the power source and said second contact being connected with said signal means wherein engagement of said brake drum with said first and second contacts provides electrical continuity therebetween to enable said signal means.

3. The combination as set forth in claim 2 in which said first and second contacts comprise soft metallic elements of a predetermined thickness, said elements being mounted on a non-conductive strip, and in which non-conductive strip is secured to said brake shoe on the portion of said brake shoe surface not covered by said brake lining.

4. The combination according to claim 2 in which said first and second contacts are metallic strips of anodized aluminum to electrically isolate one strip from the other and each strip from said brake shoe and in which said strips are secured directly to said brake shoe.

5. The combination as set forth in claim 1 in which said signal means is a lamp and further comprising a silicon controlled rectifier electrically connected between said lamp and said wear detector, said silicon controlled rectifier normally being in a non-conducting state and being switched to the conducting state in response to said brake drum engaging said wear detector wherein said lamp is enabled by the switching of said silicon controlled rectifier to the conducting state.

6. The combination as set forth in claim 5 in which an wear detector is associated with each wheel of a vehicle, and in which a separate lamp and control means is associated with each wear detector wherein one lamp indicates the condition of the brake lining for a given wheel.

7. The combination as set forth in claim 5 in which an wear detector is associated with each wheel of a vehicle, said wear detectors being electrically connected to a common lamp and control means wherein said lamp is enabled by any one of said wear detectors.

8. The combination as set forth in claim 1 in which said wear detector is mounted substantially on the upper surface of said brake shoe.

* * * * *